United States Patent [19]

Pretini

[11] 4,382,255

[45] May 3, 1983

[54] SECURED AUTOMATED BANKING FACILITIES

[76] Inventor: Gisberto Pretini, Via Macerata 3, S. Frediano a Settimo, Pisa, Italy

[21] Appl. No.: 311,154

[22] Filed: Oct. 13, 1981

[30] Foreign Application Priority Data

| | | | |
|---|---|---|---|
| Oct. 24, 1980 | [IT] | Italy | 9568 A/80 |
| Jan. 20, 1981 | [IT] | Italy | 9321 A/81 |

[51] Int. Cl.$^3$ .......... H04Q 3/00; E05G 5/02

[52] U.S. Cl. .......... 340/825.31; 109/3

[58] Field of Search .......... 340/825.31; 235/383; 109/2, 3, 9, 48

[56] References Cited

U.S. PATENT DOCUMENTS

| | | | |
|---|---|---|---|
| 3,949,364 | 4/1976 | Clark et al. | 340/825.31 |
| 4,003,026 | 1/1977 | Wallerstein, Jr. | 340/825.31 |
| 4,006,459 | 2/1977 | Baker et al. | 340/825.31 |
| 4,060,039 | 11/1977 | Lagarrigue | 109/3 |
| 4,122,783 | 10/1978 | Pretini | 109/3 |
| 4,308,803 | 1/1982 | Pretini | 109/3 |

*Primary Examiner*—Donald J. Yusko

*Attorney, Agent, or Firm*—McGlew and Tuttle

[57] ABSTRACT

An automated banking system comprises a room with controlled access by the public and having an area which is monitored by at least one surveillance camera. The area includes equipment defining an automated bank counter and an assembly of strongboxes disposed on a movable apparatus and adapted to be controlled so that a specific strongbox can be presented to an access position which is also monitored by the camera.

7 Claims, 11 Drawing Figures

SECURED AUTOMATED BANKING FACILITIES

BACKGROUND OF THE INVENTION (1) Field of the Invention

The present invention relates to automated banking systems.

(2) Description of the Prior Art

Recently, banking establishments have been adopting "continuous cash" systems which can remain in operation not only during the time the bank is open but also during the hours of night. At the present time, there is also considerable development in so-called "automated counters" defined by computer terminals which are capable of carrying out the major part of banking transations and which operate on a 24-hour basis, the counters being installed in a location which is accessible to customers who wish to take advantage of these services. For access, the customer generally has at his disposal a special identity card issued by the bank.

Automated counters are in particular designed for the despositing and withdrawal of cash. With these systems, there is a risk of robbery in that, under compulsion, a customer may be forced to enter the location and withdraw cash from the automatic facility. Thus, by following a customer, a criminal can carry out actual robberies.

SUMMARY OF THE INVENTION

According to the invention, there is provided an automated banking system characterised by a room accessible to the public and having an area which is monitored by at least one surveillance means, said area including equipment defining an automated bank-counter and an assembly of strongboxes disposed on a movable apparatus and adapted to be controlled so that a specific strongbox can be presented to an access position.

Access to the room may be provided through a corridor having, at the bank access end, a sliding or rotating door with two surveillance cameras at the ends of the corridor.

The strongbox assembly is protected by pressurised walls (which also define possible access zones for servicing purposes) which activate signalling means (such as a siren or "silent alarms") and/or intruder deterrent means (such as hypnotic or paralysing gas) in the event of an attempt being made to pierce the pressurised wall.

The cameras will be protected against any type of fraudulent action.

Further according to the invention, there is provided an automated banking system characterised by a revolving strongbox assembly having automatic control means for presenting a selected strongbox to an access position, the access position being within a robbery-resistant protective area defined by an entry corridor and, at the bank access end of the corridor, a door having revolving compartments with a fixed central axis carrying two surveillance cameras whereby a guard can monitor the protective area from a remote surveillance position and control the door.

More particularly, in a preferred embodiment, the banking system comprises a revolving strongbox assembly functioning automatically and operated by selective electronic or electromechanical means for "seeking" the strongbox required. The whole is protected by a robbery-resistant protective system defined by an entry corridor consisting of panels of reinforced aluminium sections (or another material capable of meeting the same requirements), at the bank access end of which there is installed a door having compartments rotatable around a fixed axis and carrying two cameras connected to monitors in adjacent rooms or — by air or cable — to monitors or recording devices installed in a remote surveillance centre, from which centre it is possible for a guard to lock the door, set it in motion and/or in reverse, by means of radio wave devices, and maintain audio contact with the room.

BRIEF DESCRIPTION OF THE DRAWINGS

Embodiments of the invention will now be described, by way of example only, with reference to the accompanying diagrammatic drawings, in which.

DESCRIPTION OF THE PREFERRED EMBODIMENTS

Figure 1:
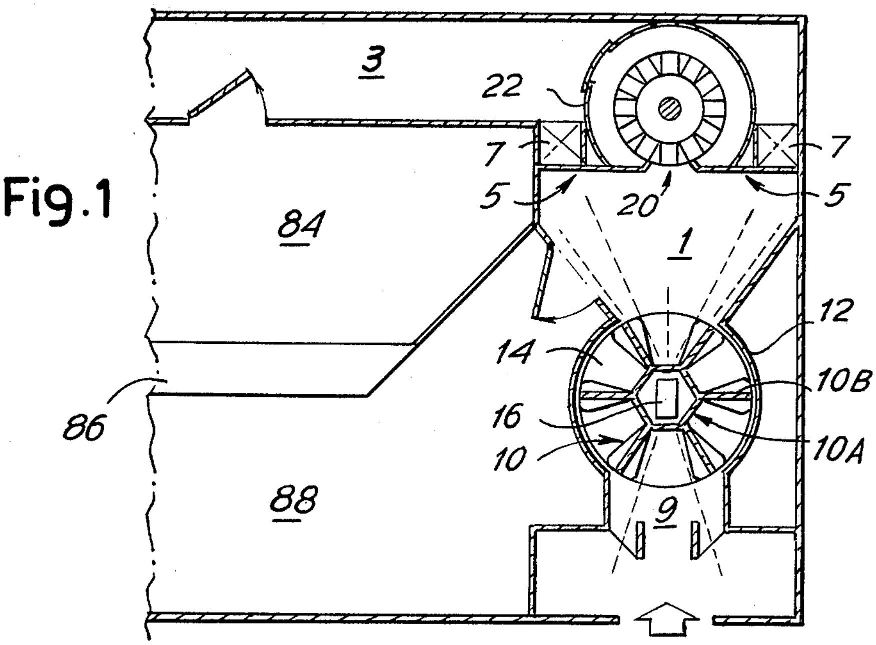
FIGS. 1 and 2 are plan views of two embodiments of an automated banking system in accordance with the invention.
Figure 2:
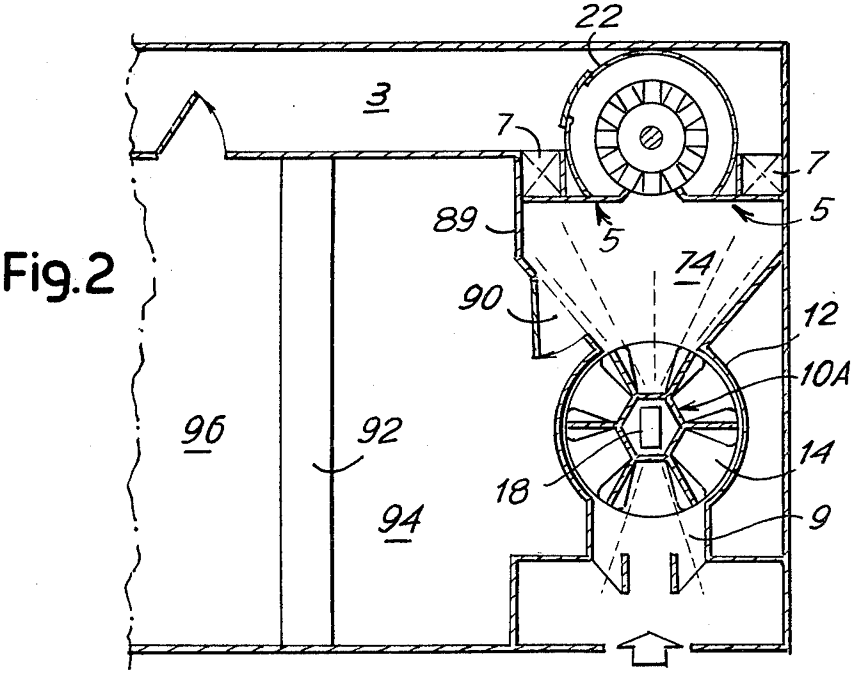

With initial reference to FIGS. 1 and 2, reference numeral 1 denotes a room to which customers may have access to automated banking facilities. Reference numeral 3 denotes an area inside the bank which is not accessible from the outside and which is adequately protected. Rooms 1 and 3 are separated from each other by a division 5 in which is installed an adequate number of computer terminals generally designated 7 and which define an automated bank counter.

Access to the room 1 is gained via a passage 9 which is monitored by a robbery-resistant system offering a specific anti-hostage function and identified by reference numeral 10. In the embodiment shown, this comprises a fixed central structure 10A and a revolving door 10B which rotates about a vertical axis and about the fixed structure 10A. Together with fixed partial cylindrical walls 12, the door 10B defines a plurality of revolving compartments 14 to which only one person at a time may have access. The revolving door 10B may be manually and/or automatically locked according to already known criteria. The door arrangement makes it possible to reduce the danger of criminal acts involving hostages. In particular, there is installed on the fixed central axis of the revolving door surveillance means preferably consisting of two television cameras 16, 18. The camera 16 faces forwardly to monitor the space 1 in front of the division 5 where the computer terminals are installed, such observation involving no blind spots. The camera 18 faces rearwardly to monitor the corridor 9 which offers access from the outside.

The two cameras are capable of transmitting by air or cable, signals depicting whatever is happening in the room itself and the access corridor, the signals being fed to monitors and/or recorders installed in a remote surveillance centre, possibly in addition to others in rooms adjacent to the installation. This will provide considerable deterrent to any attempt at robbery, on account of the risk of the criminal's picture being recorded, the criminal being unable to enter (or move around) with his face covered because at the moment of entering his criminal intent would be revealed so that he would run the risk of being locked in a compartment of the revolving door, or in the room 1, while similar behaviour in the access corridor would be likely to result in his being locked in the corridor 9 in front of the revolving door. According to FIGS. 1 and 2, the camera 16 can monitor the entire division 5 and thus also in particular and at any moment persons engaged in activities on this division, since the entire space 1 is projected, in other words it is defined without any blind spots.

As is shown in the drawings, there is an intermediate zone 20 of the division 5 (and in this particular case in the centre of the division) providing access to strongboxes. This zone 20 can be monitored in the same way as the automated counters 7 by the camera which therefore also keeps the customer under observation at the moment when he is using his own strongbox. It is possible to present to the zone 20 the strongbox desired since this is mounted on a movable apparatus having a security system.

As shown in FIGS. 3 to 5, 22 denotes a cylindrical wall which defines together with bottom wall 24 and upper wall 25, a cell in which the strongboxes are contained. This cell may be accessible from the room 3 through a door 28 which may be a sliding door. The walls 22, 24, 25, together with radial wallportion 30, are advantageously constructed from pressurised panels capable of indicating a break-in employing a drilling process, by virtue of the consequent drop in pressure. Radial wall portions 30 together with an aperture in the cylindrical wall 22, define the access zone 20 for the strongboxes. Admission to the access zone 20 can be controlled by a door 32, which can for example be slid open, by a key or by a particular identity card issued by the bank. At the rear, the access zone 20 is defined by a back wall 34 in which there is provided a large aperture 36 which is vertical in its development and which is closed by a plurality of small doors 38 disposed one above another. Each small door may be selectively opened, for example slid open (as shown at 38A). The opening of one of the small doors allows access to the individual strongboxes which are disposed at the level of the door in question. Instead of the plurality of small doors 38, it is also possible to provide a single door.

Inside the walls 22, 24 and 25 (FIGS. 3 and 4), there is a strongbox assembly 40 which in the embodiment shown is a rotating assembly which rotates about a vertical axis 42. The assembly 40 is mounted on bearing means 44, 46, at least the bearing 44 being a thrust bearing. The assembly 40 comprises a plurality of peripherally disposed strongboxes 48 which are radially orientated and accessible from outside via a corresponding door 50 which is locked by a key. Vertical columns of strongboxes are provided, with the individual boxes being horizontally aligned with the boxes of the other columns and located at the same level as their counterparts in the other columns. Therefore, all the boxes in a particular vertical column, upon displacement of the assembly 40, can be presented in front of the vertical aperture 36. The opening of a specific small door 38 (such as 38A) provides access to a box at a certain level in the column. In practice, it is envisaged that the opening of one of the small doors 38 shall render available to the user a push-button capable of "calling forward" one or other of the strongboxes located at the level of the door which has been opened or, selectively, if the equipment is provided with an electronic seeking device.

Figure 3:
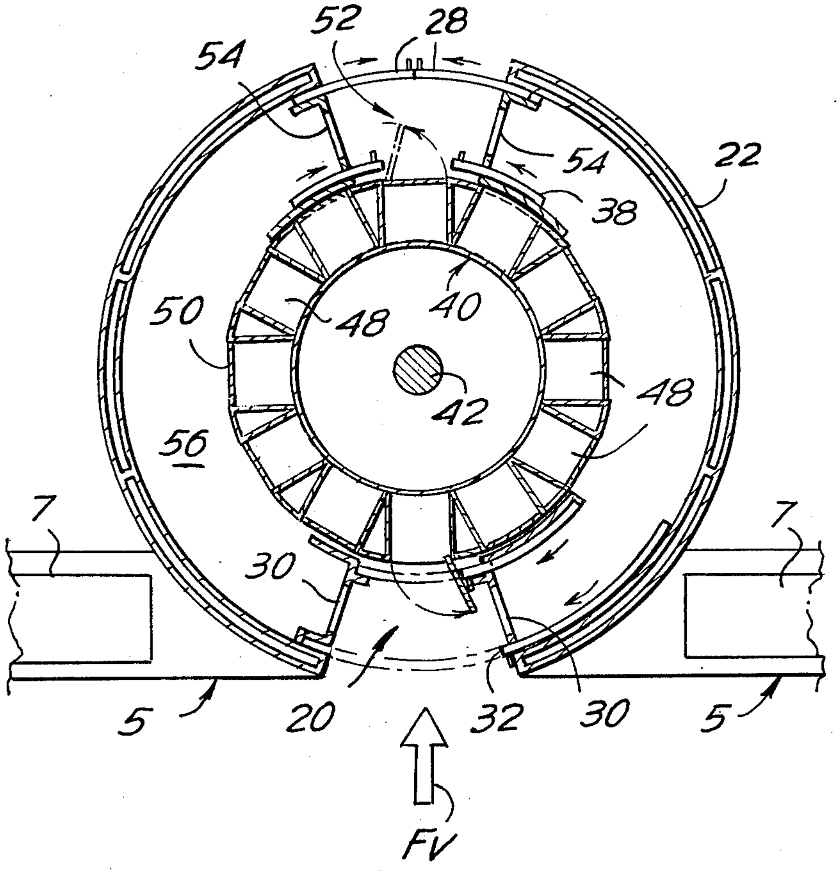
FIG. 3 shows an enlarged detail of FIG. 1 and is a plan view of a strongbox assembly.
Figure 4:
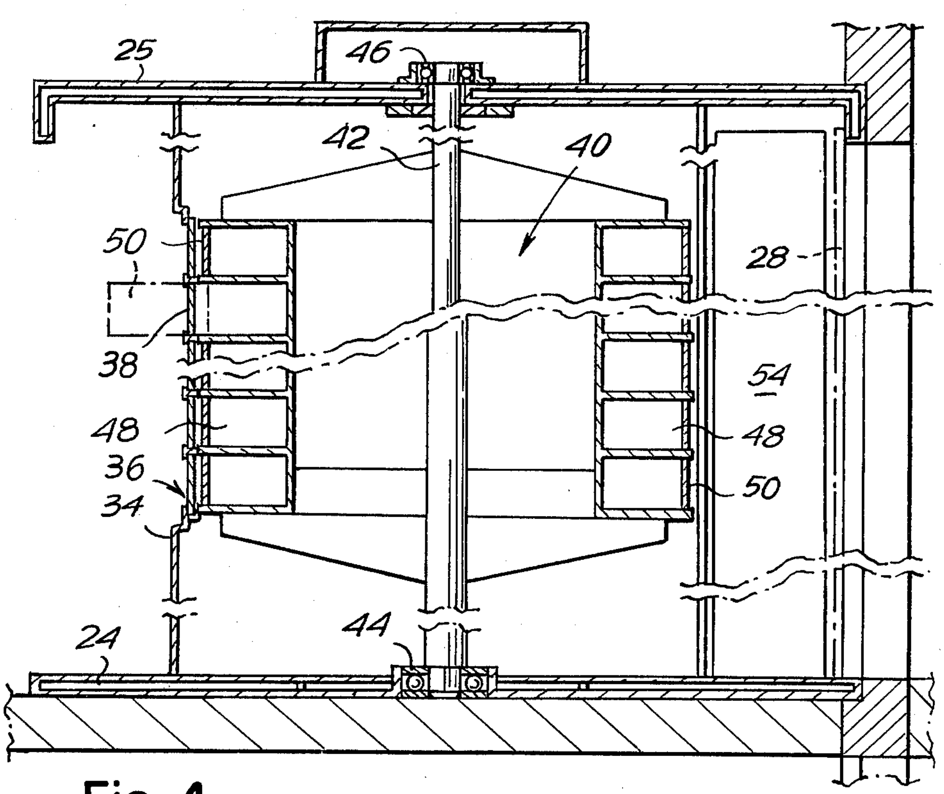
FIG. 4 is a vertical section through the strongbox assembly.
Figure 5:
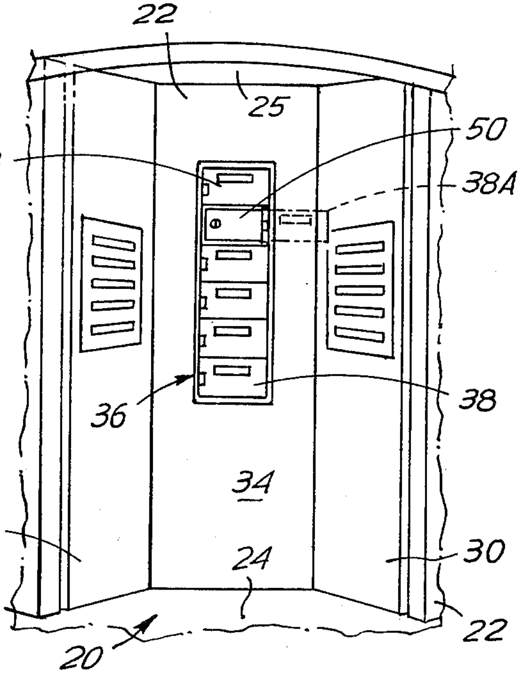
FIG. 5 is a view substantially in the direction of the arrow fV of FIG. 3.

An access arrangement (for example 52) may be provided on the opposite side to the zone 20, corresponding to the small door 28 (FIG. 3). It is however also possible to gain access through the small door 28, possibly through grilles or other closure means 54, to corridor spaces 56 which extend around the assembly 40 and which provide a means of servicing and the like.

With the arrangement described, the user who is the holder of a strongbox, at any time when the bank is not operational, if he is in possession of the particular identity card to which reference has been made, or of the keys supplied to him by the bank, may gain access to the space 1 and to the zone 20 so that he can open the small door 38 at the level at which his own strongbox is located. Then, using the push bottom, he can cause the assembly 40 to rotate until such time as his strongbox is disposed in front of the opened door 38. If the strongbox assembly is automated, the calling-forward and stopping, being codified, will occur automatically. It should be noted, however, that these operations occur while the user himself is in the access zone 20 and is therefore monitored by the television camera or by other surveillance apparatus which may possibly be suitably located in the room in order to monitor the division 5 in conjunction with an appropriate system for monitoring access into the space 1. In this way it is possible to avoid uncontrollable and criminal actions in connection with the security strongboxes, which may occur if the operator were to be diverted from watching the monitors.

Figure 6:
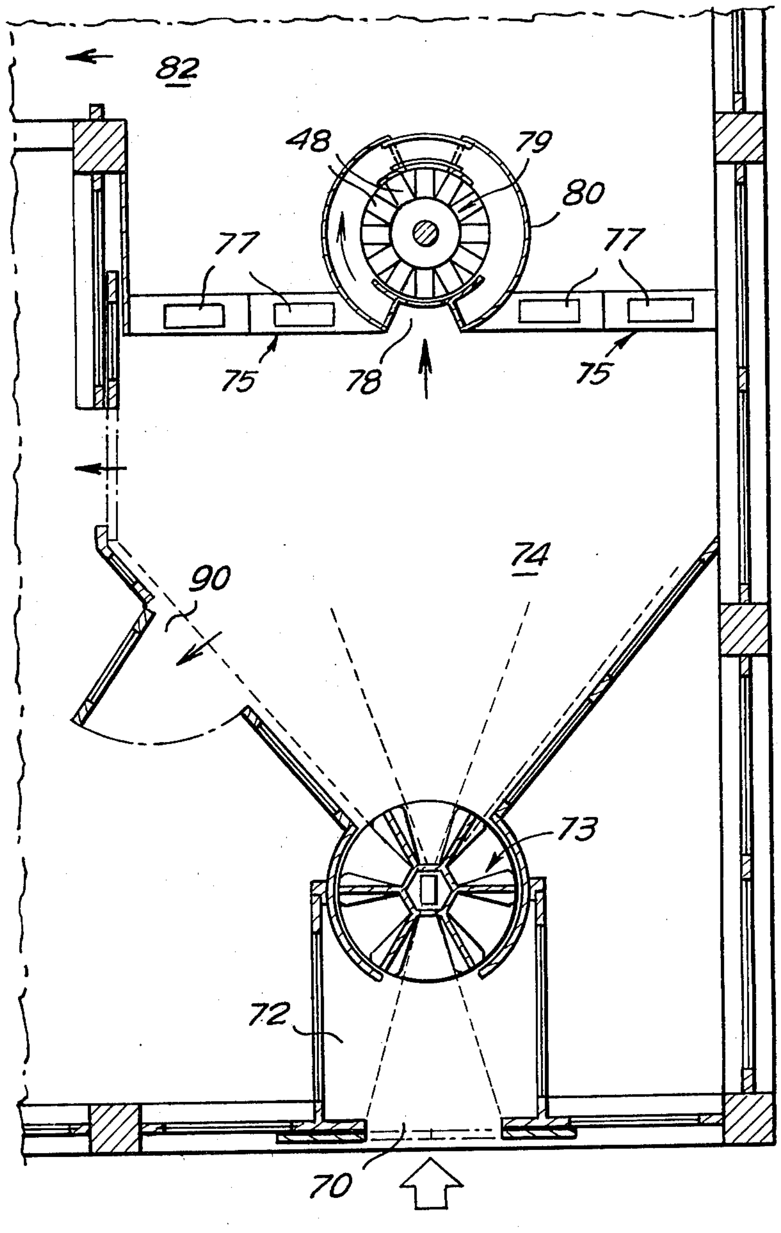
FIGS. 6 to 11 are plan views showing alternative arrangements.
Figure 7:
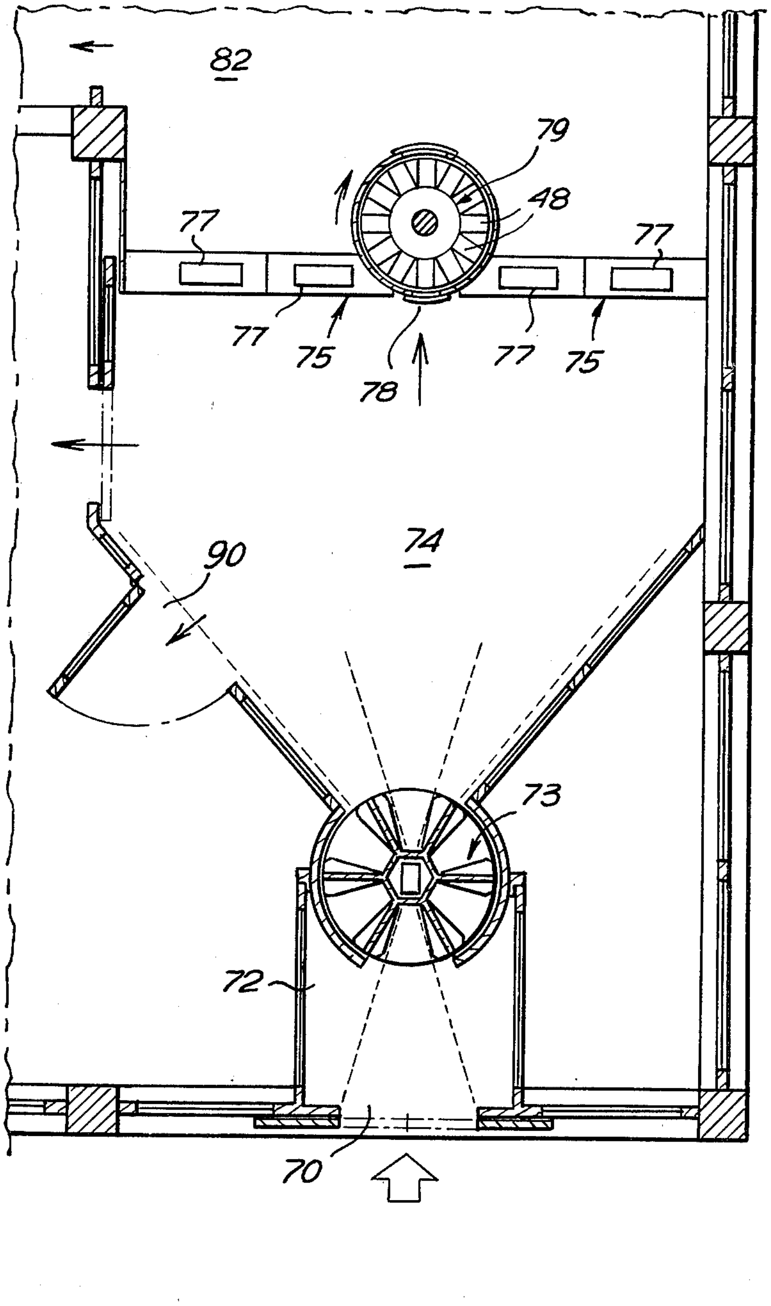

FIGS. 6 and 7, also in conjunction with FIGS. 1 and 2, show two further possible arrangements of the system. In FIGS. 6 and 7 there is provided: an access 70 from outside, a corridor 72 similar to the corridor 9, a door having revolving compartments 73 and similar to the door 10B, a room 74 with a division 75 including automated counters 77 and an access zone 78 for a customer who wishes to engage in activities concerning the strongboxes. Reference numeral 79 denotes a revolving strongbox assembly corresponding to the assembly 40 in the preceding embodiments, with a protective pressurised wall 80 equivalent to the wall 22. In FIG. 6 there is shown a space be a room 82 which is equivalent to the room 3 in the preceding embodiments is in communication with a room 84 (see FIG. 1) for officials, the room 84 being separated by a bench 86 from a room 88 for the public. This room 88, separated from the room 74 by a wall 89, is accessible to the public via the space 74 (FIG. 6) by means of a door 90 which can be closed when the bank is not open. In the alternative arrangement shown with reference in FIG. 2, a bench 92 is disposed transversely relative to the bench 86 of FIG. 1, in order to sub-divide the space 94 for the public from the space 96 which is intended for the bank staff. The space 94 is again separated from the space 74 by the wall 89 in which there is the door 90. The door 90, too, is monitored by the surveillance camera 16. With the arrangements shown in FIGS. 6 and 7 (and other equivalent arrangements), the same surface area is occupied by the complex defined by the robbery-resistant protective system and by the automated counter, both for sevice during the time the bank is open and for continued service of the automated counters and the strongboxes, the automated service also easing the work load of the bank staff.

Figure 8:
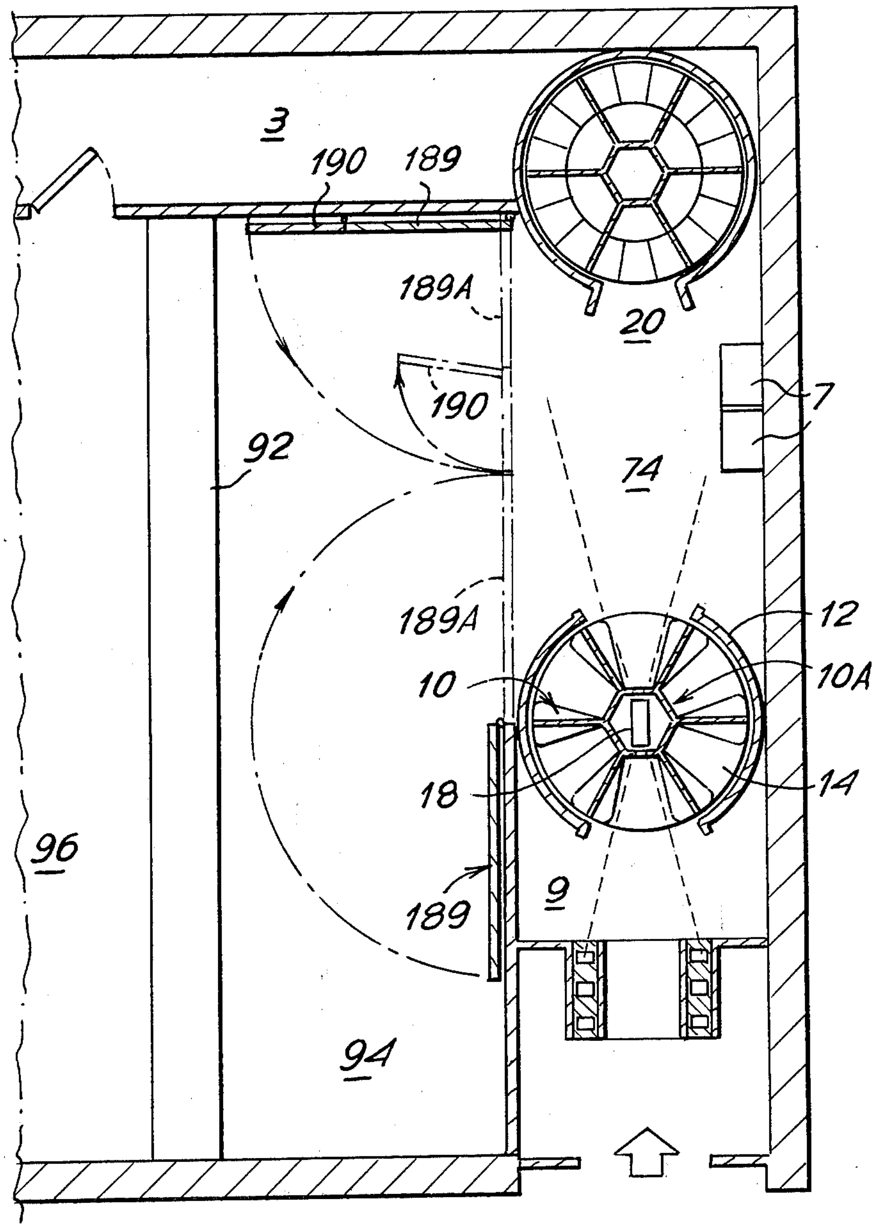
Figure 9:
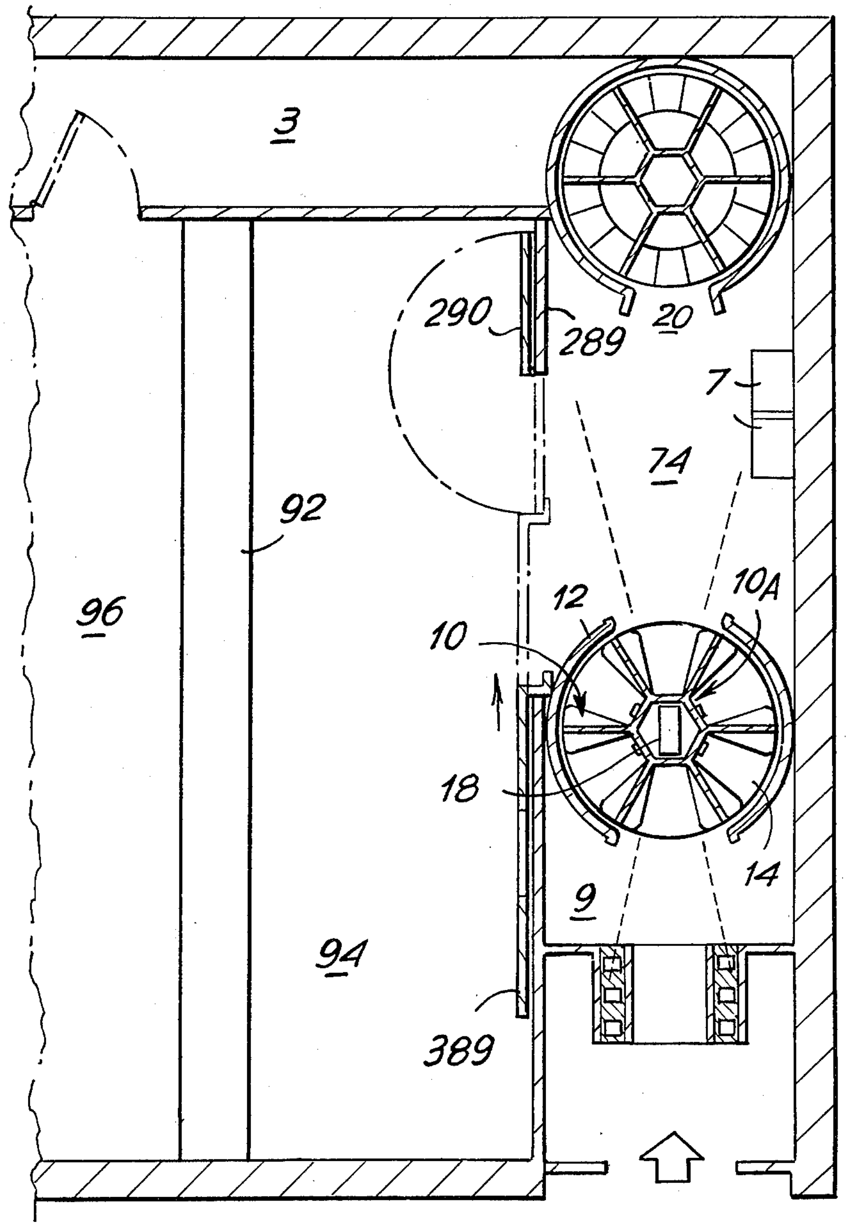

In the alternative embodiments shown in FIGS. 8 and 9, in order to increase as much as possible the space 94, this space is able to fully communicate with the room 74. In the embodiment shown in FIG. 8, walls 189 are used which are movable angularly between the moved-aside position illustrated and the position 189A in which they provide separation between the two spaces; in this latter position, a door 190 serves for the personnel required to put the rooms in order at the time of opening and closing the spaces 94, 96. In the alternative embodiment shown in FIG. 9, a wall part 289 is fixed and provided with the door 290, while another wall part 389 is adapted to slide between a moved-aside position and a position in which it separates the two spaces 94 and 74, with the help of the door 290.

Figure 10:
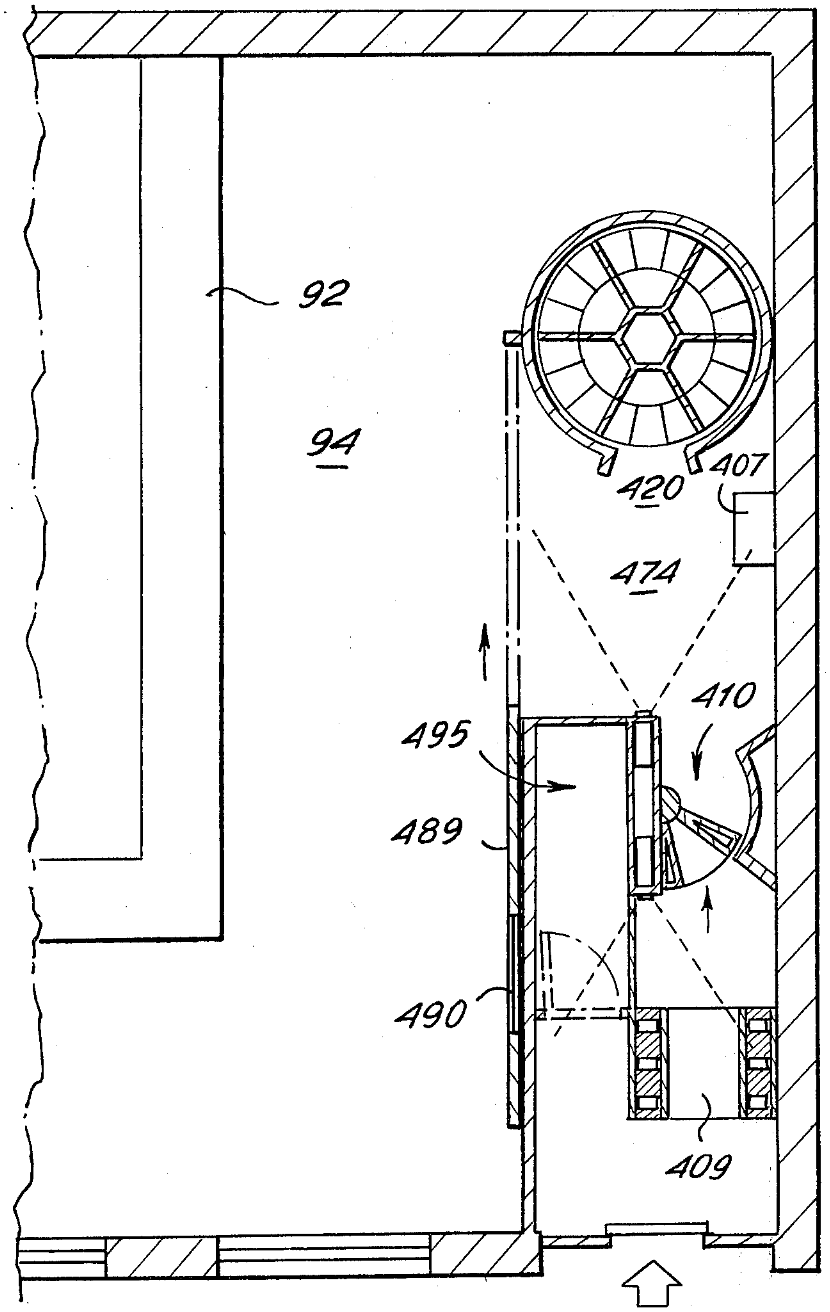
Figure 11:
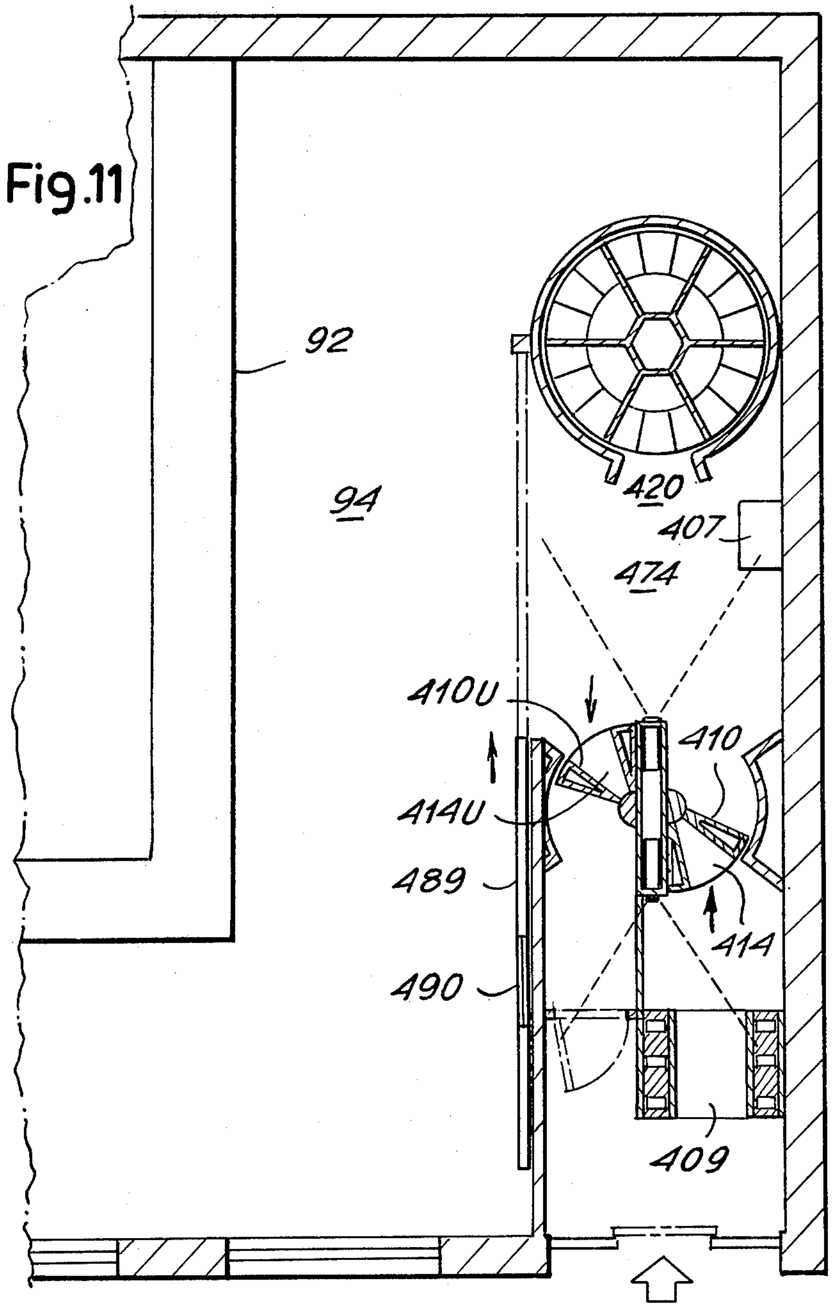

FIGS. 10 and 11 show an embodiment which is suitable for very limited spaces. In this case, access is provided via a passage and a door 410 which is capable of angular movement and which forms a compartment 414 in which only one person at a time can move from the outside to the inside (or vice versa). Disposed in a space 474 is a zone 420 for access to the strongboxes and laterally there are one or a plurality of automated small doors 407. The space 474 can be separated from the space 94 adjacent to the bench 92 by means of a sliding wall 489 having a door 490.

Provided in FIG. 10 is a single inlet and outlet door 410, 414 and at the side a surveillance room 490 (or an outlet corridor, in which case the door 410, 414 is designed only for access).

Provided in FIG. 11 is a door 410, 414 for access and a second door 410U, 414U is provided as an exit.

In further modified arrangements access can be monitored by a system other than that illustrated with revolving compartments, and it is for example possible to adopt a system having a corridor and spaced-apart doors which can be opened by rotation or sliding.

In other modified arrangements, the rotating assembly, such as 40 or 79, can additionally include a continuous cash facility accessible via the zone 20 or similar.

The systems particularly described herein provide the facility of a continuously available strongbox service within a robbery-resistant environment.

What is claimed is:

1. In an automated banking system, means defining a room accessible to the public, at least one surveillance means monitoring an area of said room, said area including equipment defining an automated bank counter and an assembly of strongboxes, means defining an access position for said strongbox assembly, and movable apparatus carrying said strongbox assembly, said movable apparatus being controlled so that a selected strongbox can be presented to said access position.

2. A system according to claim 1, wherein the movable apparatus comprises a rotor having a vertical axis of rotation on which the strongboxes are peripherally disposed in a plurality of rows at different levels, said strongboxes being accessible from the outside.

3. A system according to claim 2, wherein said access position includes a plurality of doors arranged in a vertical row and which can be opened by key means in the possession of the customer, to allow the customer access to the boxes at one level.

4. A system according to claim 1, further comprising a controlled access door leading to the room and means defining a corridor leading to said door.

5. A system according to claim 5, comprising surveillance means for monitoring said corridor.

6. A system according to claim 1, further comprising pressurized walls protecting the strongbox assembly.

7. In an automated banking system, means defining a robbery resistant protective area, a revolving strongbox assembly having a plurality of strongboxes, means defining an access position, within said protective area, for said strongbox assembly, said assembly being automatically controlled to present a selected strongbox to said access position, a door leading to said area, a corridor leading to said door, said door having revolving compartments with a fixed central axis, surveillance camera means mounted in the zone of said door to monitor said area and said corridor.

* * * * *